(12) United States Patent
Hsueh

(10) Patent No.: US 7,137,643 B1
(45) Date of Patent: Nov. 21, 2006

(54) ANTI-SWAY TRAILER HITCH

(76) Inventor: Paul Y J Hsueh, 4790 Myrtle Dr., Concord, CA (US) 94521

( * ) Notice: Subject to any disclaimer, the term of this patent is extended or adjusted under 35 U.S.C. 154(b) by 0 days.

(21) Appl. No.: 10/908,672

(22) Filed: May 23, 2005

(51) Int. Cl.
*B60D 1/34* (2006.01)

(52) U.S. Cl. .................. 280/455.1; 280/497; 280/461.1

(58) Field of Classification Search ............ 280/446.1, 280/455.1, 456.1, 461.1, 492, 497
See application file for complete search history.

(56) References Cited

U.S. PATENT DOCUMENTS 2,772,098 A * 11/1956 Seeley ..................... 280/461.1
4,598,926 A * 7/1986 Gallatin .................... 280/461.1
4,614,353 A * 9/1986 Mayer ...................... 280/455.1
4,949,987 A * 8/1990 Gallatin .................... 280/461.1
6,485,046 B1 * 11/2002 Hsueh et al. ............. 280/455.1

* cited by examiner

*Primary Examiner*—Lesley D. Morris
*Assistant Examiner*—Matthew Luby

(57) ABSTRACT

An anti-sway trailer hitch connection is provided for use between a towing vehicle and a trailer and includes structure whereby slight left and right lateral movement of the forward end of the towing vehicle will not be translated into right and left lateral movement, respectively, of the forward end of the trailer, and thereby eliminates the tendency of a trailer to sway back and forth while a towing vehicle changes lanes on a highway or is acted on by cross-wind gusts from the passing of a large vehicle.

12 Claims, 10 Drawing Sheets

ANTI-SWAY TRAILER HITCH

CROSS-REFERENCES TO RELATED APPLICATIONS

Not applicable.

STATEMENT REGARDING FEDERALLY SPONSORED RESEARCH OR DEVELOPMENT

Not applicable.

REFERENCE TO a MICROFICHE APPENDIX

Not applicable.

TECHNICAL FIELD

The present invention relates generally to trailer hitches, and more particularly to an improved anti-sway trailer hitch.

BACKGROUND INFORMATION AND DISCUSSION OF RELATED ART

Inasmuch as most passenger vehicles and the like include rear overhang portions, which project considerably rearward of the rear wheels of the vehicle, and trailer hitches are constructed in a manner such that the forward tongue portion of a trailer towed behind such vehicles are actually coupled to the vehicles at a point spaced slightly rearward of the rear bumpers of the vehicles, any slight left and right lateral shifting of the forward end of the towing vehicle results in right and left lateral shifting, respectively, of the forward end of the trailer.

This operational feature of the combination of a passenger vehicle and a trailer being towed there behind can be very dangerous, especially when the vehicles are moving at highway speed, such that the vehicles are having momentums such that a sudden lateral changing of direction of the towing vehicle can cause a serious swaying problem of the trailer.

Because the towing vehicle rearward end displaces to the side that is opposite to its forward end, it is especially dangerous when vehicles are in a down hill situation such that the weight of the trailer adds to the momentum of the trailer and the trailer has the tendency to push the towing vehicle rearward end off the moving course.

The towed vehicle-swaying problem is also pronounced when the towed vehicle has a large side elevation area upon which crosswind gusts and slip stream blasts may act on the towed vehicle for creating a sudden unstable condition.

Accordingly, a need exists for a hitch connection between a vehicle and a trailer that eliminates the swaying tendencies of the vehicle and trailer combination as a result of slight lateral shifting of the forward end of the towing vehicle.

Various solutions to the problem of trailer swaying have been proposed with anti-sway trailer hitches that include at least some of the general structural and operational features of the instant invention are disclosed in U.S. Pat. Nos. 2,201,660, 2,913,256, 3,254,905, 3,785,680, 3,787,077 and 3,825,282.

The most closely related improvement in anti-sway trailer hitch assemblies was disclosed in U.S. Pat. No. 6,485,046, by the present inventor. But, the '046 patent hitch assembly has a limitation for limiting the towing vehicle turning angle, such that, at a larger turning angle, the control rod that connects the hitch beam to the control beam will move closer to and interfere with the intermediate bar on the hitch assembly, thus limiting the towing vehicle turning angles.

SUMMARY OF THE INVENTION

An anti-sway trailer-hitch assembly for connecting a towing vehicle to a towed vehicle having symmetrical anti-sway features.

The vast majority of passenger vehicles include a substantial vehicle mass that projects rearward from the back wheels of the vehicle. With a conventional trailer hitch installed on the rearward end of the towing vehicle, a slight left and right lateral shifting of the forward end of the towing vehicle results in concomitant right and left lateral shifting of the connecting towed vehicle forward end.

With the present anti-sway trailer hitch invention installed on the rearward end of the towing vehicle, a slight left and right lateral shifting of the forward end of the towing vehicle will result in a concomitant lateral shifting left and right, respectively, of a hitch ball affixed to a hitch beam on the anti-sway trailer hitch.

The hitch ball lateral left and right shifting displacements cancel out the towing vehicle rearward end lateral right and left shifting displacements respectively, so that the hitch ball remains at the same location and does not shift laterally.

With the towed vehicle forward end connected to the hitch ball, the towed vehicle forward end does not shift laterally when the towing vehicle forward end shifts laterally, and thus the towed vehicle remains stable and does not sway.

DETAILED DESCRIPTION OF THE INVENTION

Figure 1:
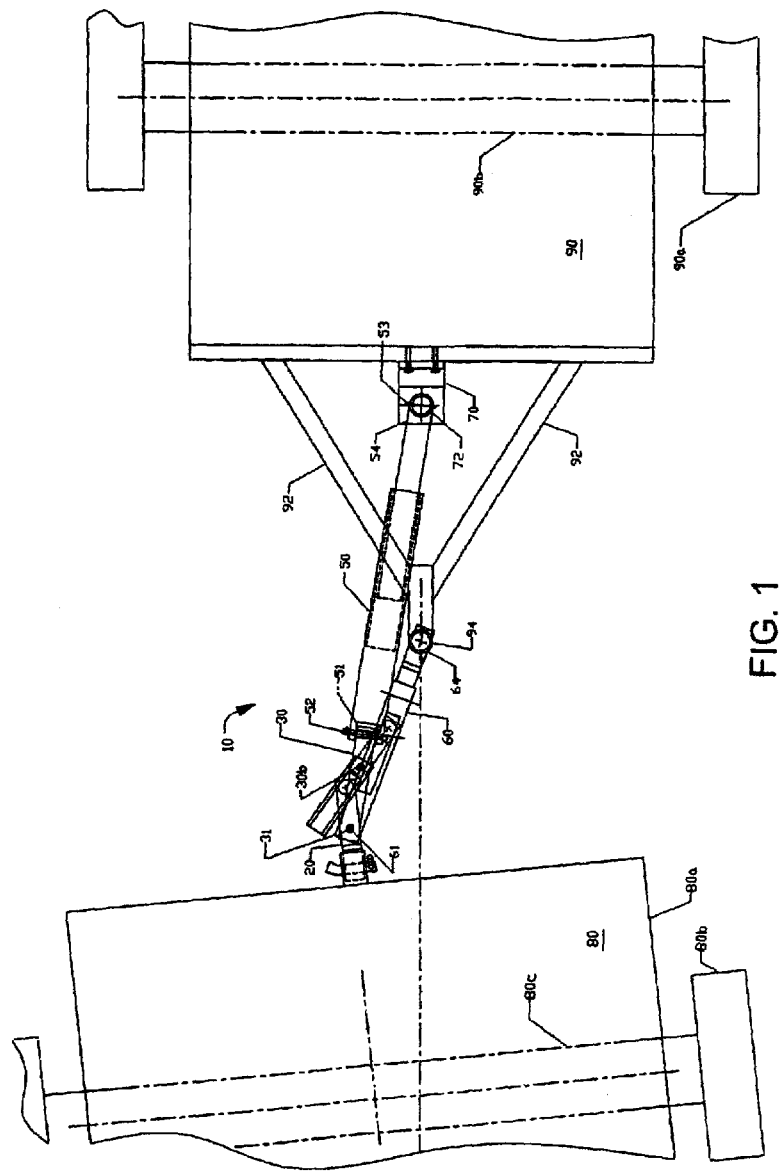
FIG. 1 is a plan view of the trailer hitch according to the present invention of connecting a towed vehicle in the form of a trailer to a towing vehicle.
Figure 2:
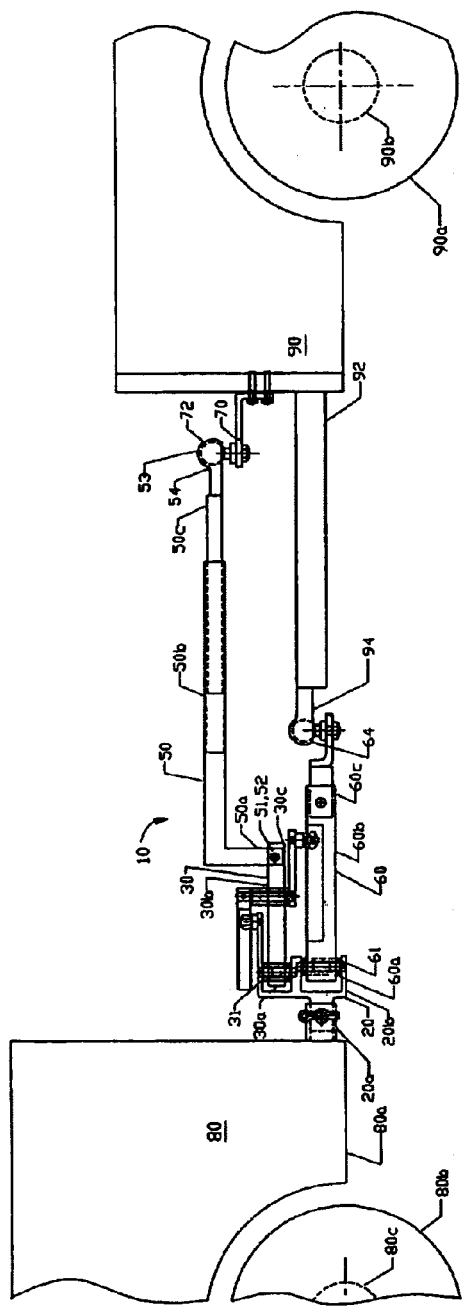
FIG. 2 is a side view of the trailer hitch according to the present invention of connecting the trailer to the towing vehicle.

As illustrated in FIG. 1 and FIG. 2, A hitch assembly of the present invention is generally designated by reference numeral 10 and articulately connects a towing vehicle 80 and a towed vehicle 90. The towing vehicle 80 includes a frame 80a, rear wheels 80b and rear axle 80c. The towed vehicle 90 is in the form of a trailer having supporting wheels 90a at opposite ends of an axle 90b. Various supporting wheel and axle arrangements may be provided for the trailer 90, and the forward end of the trailer is provided with a tongue or frame structure 92 that extends forward and includes a trailer hitch coupler 94 at forward end thereof.

The hitch assembly 10 includes a hitch frame 20 having a forward end 20a and a rearward end 20b, a center beam 30 having a forward end 30a, a middle portion 30b and a rearward end 30c, a center beam-extension 50 having a forward end 50a, a middle portion 50b and a rearward end 50c, a hitch beam 60 having a forward end 60a, a middle portion 60b and a rearward end 60c, and a rear support 70.

Hitch frame 20 forward end 20a installs onto towing vehicle 80 rearward-end.

Center beam 30 forward end 30a is pivotally connecting to hitch frame 20 rearward-end 20b through a pivotal connection 31. Pivotal connection 31 allows center beam 30 to swing an arc horizontally around pivotal connection 31.

Hitch beam 60 forward end 60a is pivotally connecting to hitch frame 20 rearward-end 20b through a pivotal connection 61. Pivotal connection 61 allows hitch beam 60 to swing an arc horizontally around pivotal connection 61.

Center beam 30 rearward end 30c is pivotally connecting to center beam-extension 50 forward end 50a by a pivotal connection 51, which includes a removable pin 52. Pivotal connection 51 allows center beam-extension 50 swings an arc vertically around pivotal connection 51.

Center beam-extension 50 rearward end 50c is pivotally connecting to rear support 70 upper-end by a pivotal connection 53. Pivotal connection 53 includes a hitch coupler 54 affixing on center beam-extension 50 rearward end 50c and a hitch ball 72 affixing on rear support 70 upper end. Hitch coupler 54 engages with hitch ball 72.

The rear support 70 lower-end is affixed firmly to trailer 90 body and frame 92.

The center beam-extension 50 mid portion 50b is hollow inside such that the rearward end 50c forward section is able to slide inside mid portion 50b. This sliding feature together with pivotal connections 51 and 53 compensates for the constantly-changing distances between the two vehicles due to road conditions and vehicle turning. Besides, this sliding feature can further accommodate different trailers being towed because trailer frame 92 varies in lengths for different trailers.

Hitch beam 60 rearward end 60c including a hitch ball 64 is engaged by hitch coupler 94 affixed to the towed vehicle 90 forward end.

When connecting the towed vehicle to the towing vehicle by connecting trailer hitch coupler 94 to hitch ball 64, to make the connection easier, it is better first to remove the center beam-extension 50 completely so that it will be out of the way. For this reason, pin 52 can be removed from pivotal connection 51 on center beam-extension 50 forward end, and hitch coupler 54 can be disengaged from hitch ball 72 on rear support 70, so that center beam extension 50 can be removed completely.

Figure 3:
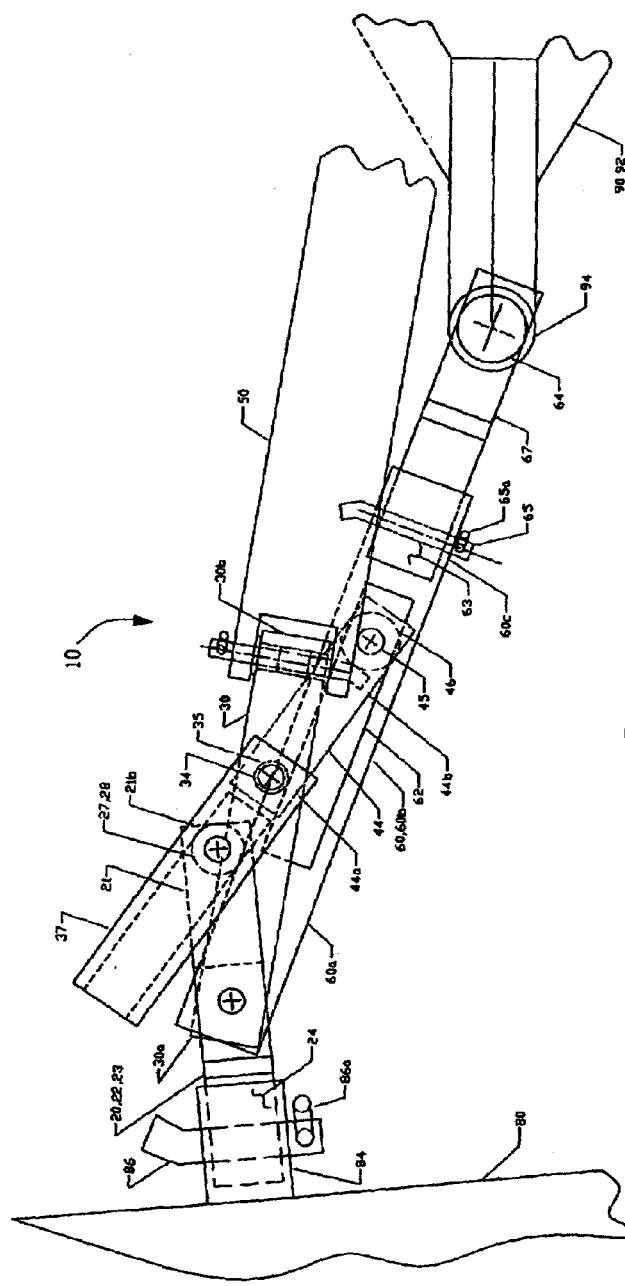
FIG. 3 is an enlarged plan view of the trailer hitch according to the present invention.
Figure 4:
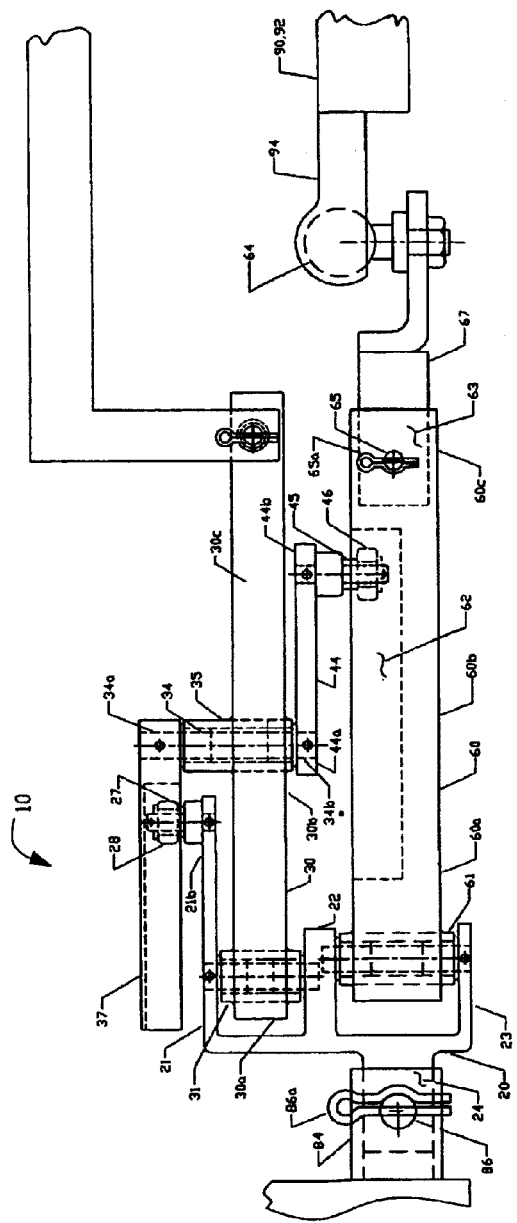
FIG. 4 is an enlarged side view of the trailer hitch according to the present invention.

Referring to FIG. 3 and FIG. 4, hitch frame 20 forward end includes a hitch tongue 24, and hitch frame rearward end includes an upper member 21 having a rearward end 21b, a middle member 22, and a lower member 23.

Hitch tongue 24 inserts into a hitch bar receptacle 84 existing on rearward end of towing vehicle 80. A removable pin 86 inserts through a hole on receptacle 84 and a hole on hitch tongue 24 to keep hitch tongue 24 inside receptacle 84. A spring pin 86a inserts through a hole on pin 86 to keep pin 86 in place.

An upwardly extending roller 28 has a pivotal connection with the upper member 21 rearward end 21b by a pivotal connection 27.

Hitch beam 60 middle portion 60b has a slot 62, and rearward end has a cavity 63.

Center beam 30 middle portion includes a vertically-positioned center shaft 34 in pivotal connection with center beam 30 by a pivotal connection 35. Center shaft 34 includes an upper end 34a and a lower end 34b that upper end 34a affixing a slot 37 extending forwardly that roller 28 on upper member 21 interposing inside slot 37.

An arm 44 has a forward end 44a and a rearward end 44b that forward end 44a affixes on center shaft lower end 34b. A downwardly extending roller 46 is in pivotal connection with arm 44 rearward end 44b by a pivotal connection 45. Roller 46 interposes inside slot 62 on hitch beam 60.

A hitch bar 67 having a forward end and a rearward end that forward end fits inside cavity 63 on hitch beam rearward end 60c. A pin 65 inserts through a hole on cavity 63 and a hole on hitch bar 67 of keeping hitch bar 67 in place, and a spring pin 65a inserts through a hole on pin 65 to keep pin 65 in place. Hitch bar 67 rearward end affixes to a hitch ball 64.

Trailer hitch coupler 94 on forward end of the trailer 90 engages hitch ball 64 on hitch beam 60.

Figure 5:
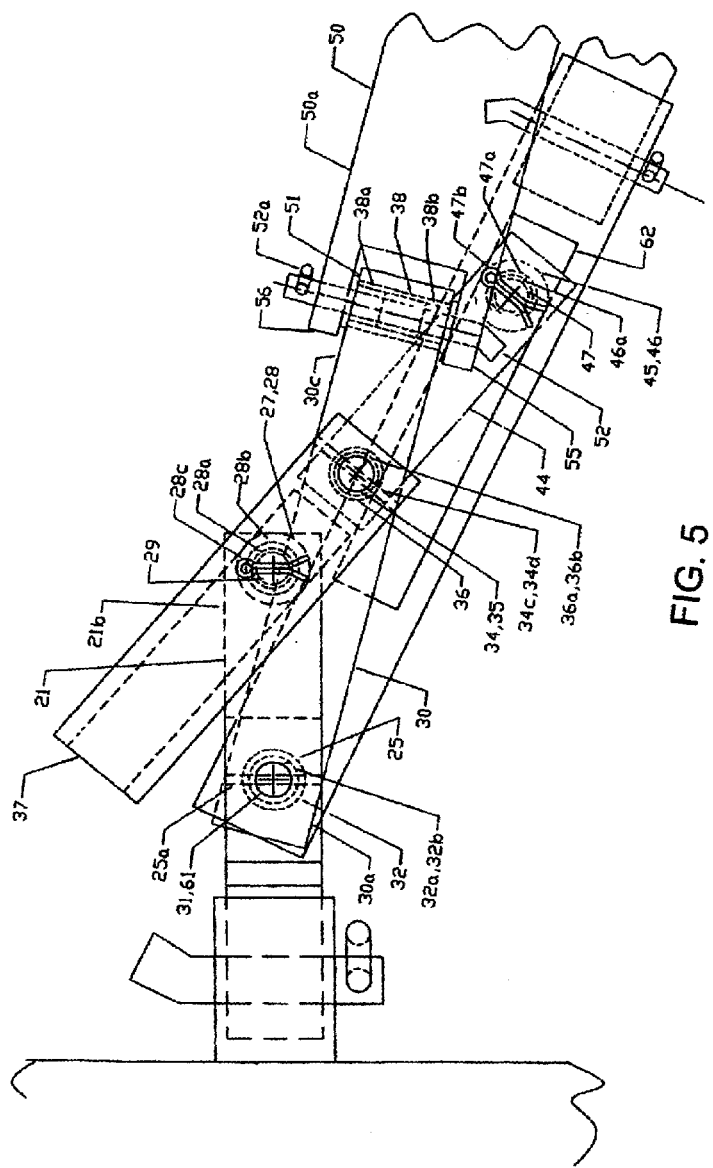
FIG. 5 is an enlarged plan view of the trailer hitch showing components details according to the present invention.
Figure 6:
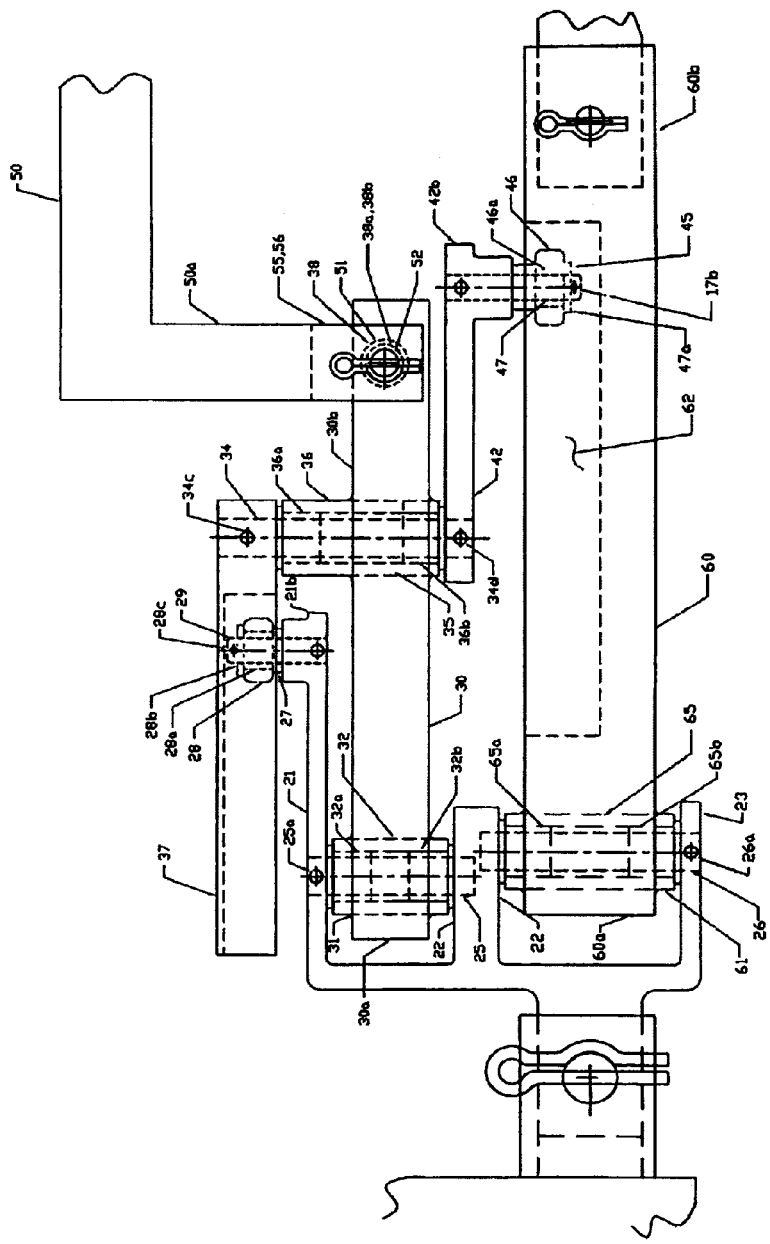
FIG. 6 is an enlarged side view of the trailer hitch showing components details according to the present invention.

Referring to FIG. 5 and FIG. 6, roller 28 pivotal connection 27 includes an upwardly extending pin 29 affixing on upper member 21 rearward-end 21b. Roller 28 is able to rotate on pin 29 through a bearing 28a interposed between the upper surface of member 21 and the lower end of roller 28. A washer 28b is inserted onto pin 27 and a spring pin 28c is inserting through a hole on pin 29 to keep roller 28 in place.

Center beam 30 forward end pivotal connection 31 includes a vertical positioned sleeve 32 extending through and affixed firmly to center beam forward end 30a. Two bearings in the form of flange bushings 32a and 32b fit tightly inside sleeve 32 at the top and bottom. Upper bearing 32a is against upper member 21 and lower bearing 32b is against middle member 22. A pin 25 inserts through a hole on upper member 21, bushing 32a, bushing 32b and a hole on middle member 22. A spring pin 25a inserts through a hole on upper member 21 and a hole on pin 25 to keep pin 25 in place. Sleeve 32 allows center beam 30 to swing in an arc horizontally around pin 25.

Center shaft 34 pivotal connection 35 includes a vertically-positioning sleeve 36 extending through and affixed firmly to center beam 30. Two bearings in the form of flange bushings 36a and 36b fit tightly into sleeve 36 at the top and bottom. Center shaft 34 is inserting through slot 38, bushings 36a, 36b and arm 44 with upper bushing 36a against slot 38 lower surface and lower bushing 36b against arm 44 upper surface. A pin 34c is inserted through slot 38 and center shaft 34, and a pin 34d is inserted through arm 44 and center shaft of securing slot and arm to center shaft. Center shaft 34 is able to rotate vertically inside sleeve 36.

Roller 46 pivotal connection 45 with arm 44 includes a downwardly extending pin 47 affixed on arm 44 rearward end 44b. Roller 46 is able to rotate on pin 47 through a bearing 46a in the form of a flange bushing inserted through roller 46. A washer 47a is placed onto pin 47, and a spring pin 47b is placed through a hole on pin 47 to keep washer 47a and roller 46 in place. Roller 46 is interposed inside slot 62 on hitch beam 60.

Pivotal connection 51 on center beam rearward end 30c includes a horizontally-positioned sleeve 38 extending through and affixed firmly to center beam 30. Two bearings in the form of flange bushings 38a and 38b fit tightly into sleeve 38 ends.

Pivotal connection 51, on center beam-extension 50 forward end 50a, includes a left fork 55 and a right fork 56 such that each fork has a hole, and center beam 30 rearward end 30c fits between the left fork and the right fork. A removable pin 52 is placed through the hole on left fork 55, bushing 38b, bushing 38a and right fork 56, and a spring pin 52a is placed through a hole on pin 52 to keep pin 52 in place. Sleeve 38 allows center beam-extension 50 to swing in an arc vertically around pin 52.

Hitch beam 60 forward-end pivotal connection 61 (not shown in FIG. 5) includes a vertical positioning sleeve 65 extending through and affixed firmly on hitch beam forward end 60a. Two bearings in the form of flange bushings 65a and 65b are tightly fit into sleeve 65 at the top and bottom. Upper bushing 65a is against middle member 22 and lower bushing 65b is against lower member 23. A pin 26 inserts through the hole on lower member 23, bushing 65b, bushing 65a and middle member 23. A spring pin 26a inserts through a hole on lower member 23 and a hole on pin 26 of keeping pin 26 in place. Sleeve 65 allows hitch beam 60 to swing in an arc horizontally around pin 26.

As shown, pivotal connections 31 and 61 are not coincidental, but pivotal connections 31 and 61 can be coincidental such that pin 25 and pin 26 can be coincidental and can become one single pin.

Refer back to FIG. 1, FIG. 2, FIG. 3 and FIG. 4 for illustrating the functions of the present invention. As shown, the towing vehicle is making a slight left turn causing the towing vehicle rearward end and hitch frame upper member 21 attaching roller 28 and roller-engaging slot 37 displacing to the right, which rotates center shaft 34 clockwise and displaces arm 44, affixing roller 46, roller-engaging slot 62, hitch beam 60 and attached hitch ball 64 to the left, and displaces hitch ball-engaging hitch coupler 94 on trailer forward end to the left. As a result, when the towing vehicle is turning to the left slightly, the towed vehicle forward end is shifting to the left too.

In the above description, it is to be noted that because center beam 30 and center beam extension 50 are connected together by pivotal connection 51, which is flexible vertically but is rigid laterally, center beam 30 and center beam extension 50 together are treated as one solid beam in the lateral direction which is the longest member in the hitch assembly. Therefore, the mid-portion of this member where center shaft 34 is affixed has less lateral movement than that of the roller 28 affixed on the hitch assembly when the towing vehicle is turning. The difference in lateral movement between roller 28 and center shaft 34 is thus able to turn the center shaft and create the subsequent movements of other components and at the end to produce lateral movement of hitch ball 64.

The hitch ball 64 lateral movement shifting amount depends on the hitch assembly construction mainly depending on its component lengths being made, such that for a fixed amount of the towing vehicle forward end lateral shifting but with different component lengths, the resultant hitch ball 64 lateral displacement will be different.

When the towing vehicle makes small turn such as a lane change, in the case when the resultant hitch ball 64 lateral displacement amount is the same as the towing vehicle rearward end lateral displacement amount but opposite in direction, such that the two displacements cancel out each other, the hitch ball 64 and engaging trailer hitch coupler remain at the same location as that before the towing vehicle was turning. As a result, the towed vehicle forward end moving direction and moving momentum is not changed nor affected by the towing vehicle forward end lateral shifting, and thus the towed vehicle remains steady and does not swing.

In the case with the hitch assembly components made such that when the lateral shifting amount of hitch ball 64 and coupling hitch coupler 94 is more than the towing vehicle rearward end shifting amount but opposite in direction, hitch ball 64 and coupling hitch coupler 94 will shift to the direction as the towing vehicle forward end shifting direction.

In this case, the towed vehicle forward end is equivalent to a pivot at a point, which is the intersection of the towed vehicle center line extension and the towing vehicle center line, and is forward of the towing vehicle rear axle.

Because the pivot point is forward of the towing vehicle rear axle, when the towing vehicle turns, the towed vehicle moving momentum follows the towing vehicle forward end turning direction, and shifts to the same direction as the towing vehicle turning direction, such that when the vehicles are reducing speed, especially in a down hill situation, the towed vehicle momentum and weight are pushing toward a point forward of the towing vehicle rear axle in the towing vehicle mid-section rather than the towing vehicle rear-end, thus having less chance for pushing the towing vehicle rearward end off the road and creating a "Jack Knife" situation.

During ordinary operations of the vehicles, due to road conditions being uneven and moving vehicle direction changes, with hitch coupler 94 engaging hitch ball 64 as the main connection and controlling the distance between the two vehicles, and the other connection between the two vehicles being the connection of center beam 30 and center beam-extension 50 between pivotal connection 31 and pivotal connection 53, the distance between the two vehicles is constantly changing, and the changing distance is compensated by the center beam-extension mid portion 50b sliding mechanism, while the elevation differences between the two vehicles is compensated by pivotal connections 51 and 53.

Also to be noted is that pivot joint 35 on center beam 30 keeps center shaft 34 vertical in center beam 30, so that slot 37 and arm 44 are maintained horizontally parallel to center beam 30. As upper member 21, middle member 22, lower member 23, center beam 30 and hitch beam 60 are all horizontally parallel, roller 28 is able to stay in slot 37, and roller 46 is able to stay inside slot 62 at all times.

Figure 7:
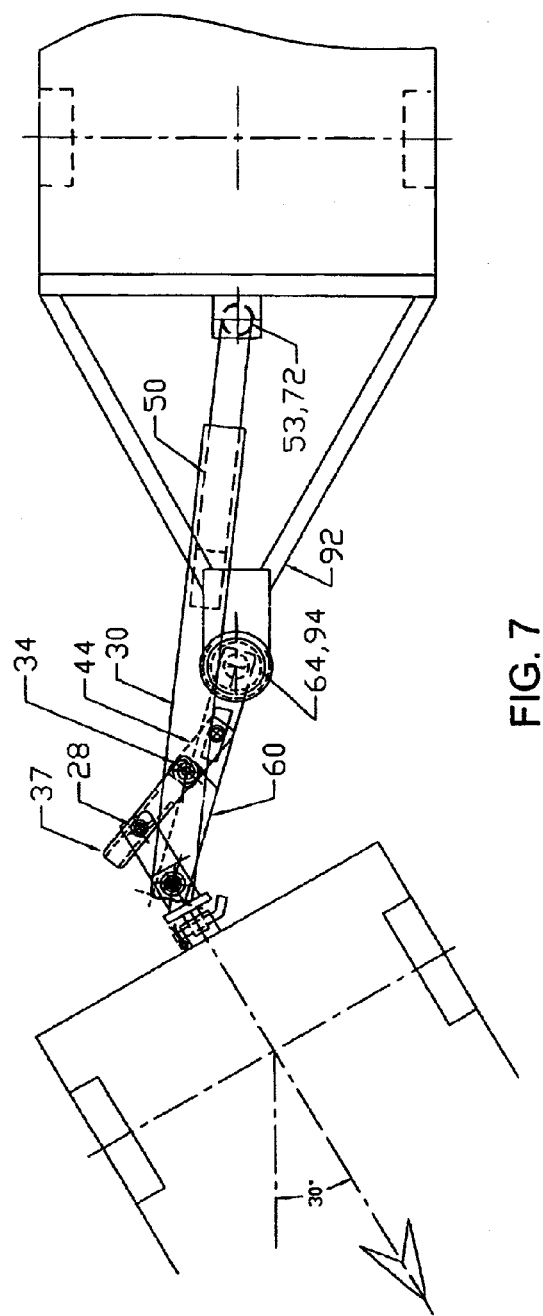
FIG. 7 is a plan view of the trailer hitch showing the vehicles are making a bigger turn.

As shown in FIG. 7, when the towing vehicle is making a bigger turn, as roller 28 displaces more, the angle forming between upper member 21 and slot 37 reduces and becomes closer to 90 degrees. The effective displacement of roller 28 against slot 37 is reducing, and an increasing roller 28 lateral movement produces a proportionally lesser angular movement of slot 37. Thus, the towed vehicle forward end does not proportionately displace laterally with the towing vehicle-turning angle.

As a result, the hitch assembly is most effective when the towing and towed vehicles are moving in a path closer to a straight line. One example is in the case when vehicles are moving on highways and have a higher speed such that a small degree of turning of the towing vehicle creates a large lateral movement of the towed forward end to make the towed vehicle forward end follow the towing vehicle turning direction. On the other hand, when the towing vehicle makes a big turn normally at lower speed, the towed vehicle forward end does not over-shift laterally, thus avoiding the case of forcing the towed vehicle forward end toward a non-ideal path.

Figure 8:
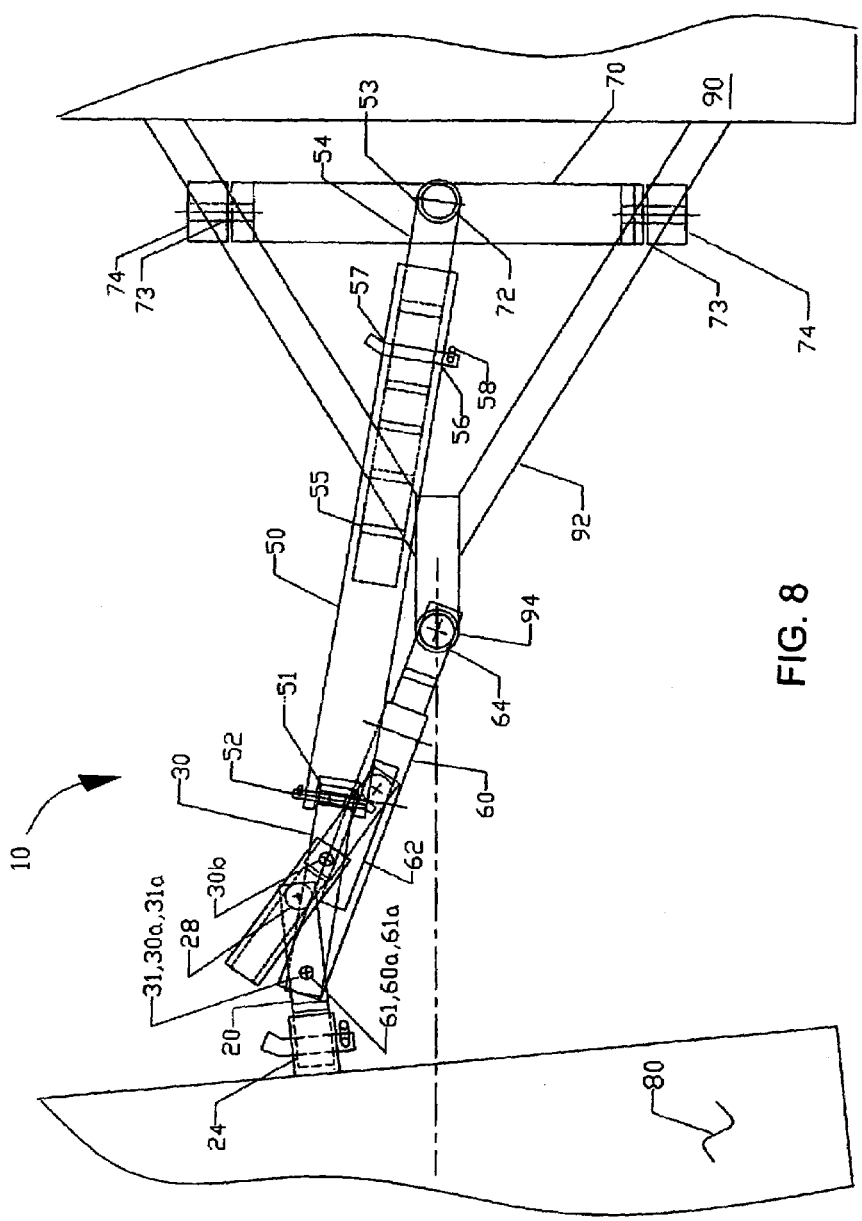
FIG. 8 is a plan view of the trailer hitch according to another embodiment of the present invention of connecting a towed vehicle in the form of a trailer to a towing vehicle.
Figure 9:
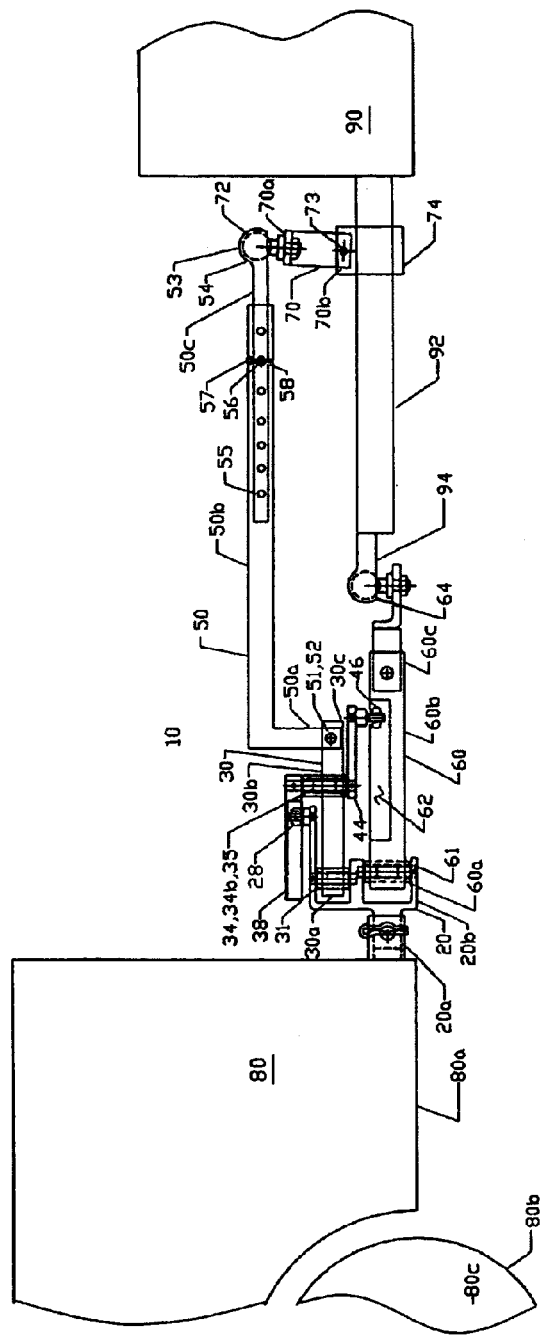
FIG. 9 is a side view of the trailer hitch according to another embodiment of the present invention of connecting a towed vehicle in the form of a trailer to a towing vehicle.
Figure 10:
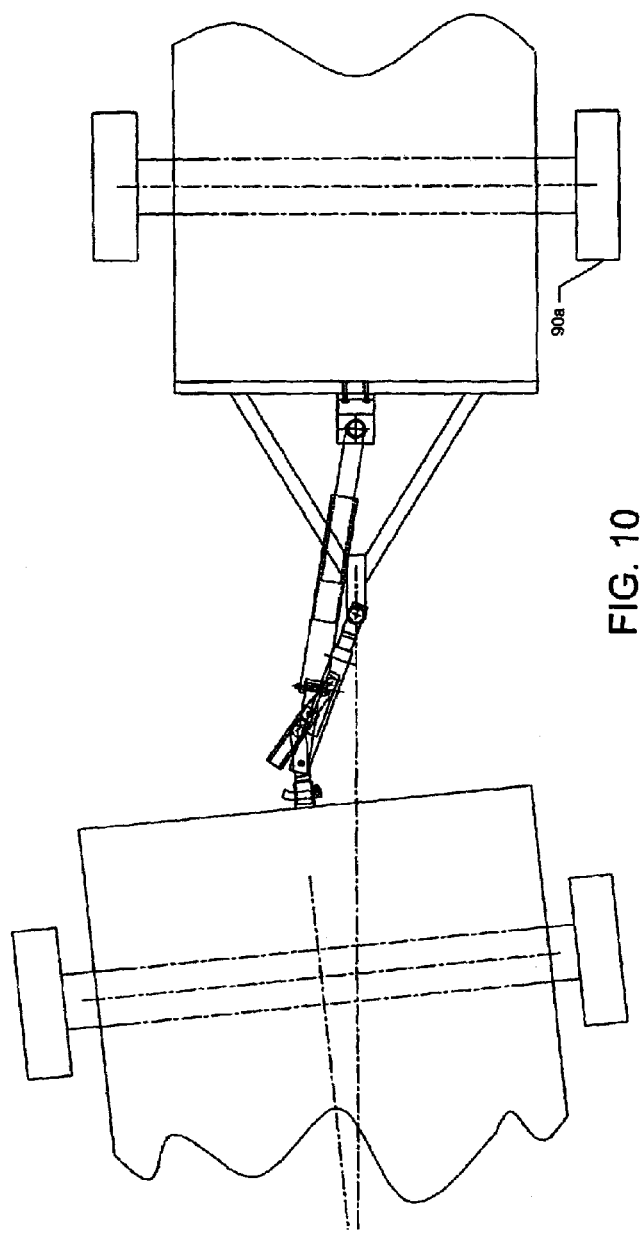
FIG. 10 is a plan view of the trailer hitch according to the present invention of connecting the trailer to the towing vehicle without individual components indication numbers.

Referring to FIG. 8 and FIG. 9, according to another embodiment of the present invention, the center beam-extension 50 includes a center section 50b, which is hollow inside, such that a center beam-extension rear section 50c is able to slide inside center section 50b. Center section 50b includes a through-hole 56 going through both walls, and rear section 50c includes a plurality of holes 55 such that a pin 57 is placed through hole 56 and one of the holes 55, and a spring pin 58 is placed through a hole in pin 57 to keep pin 57 in place.

Rear section 50c rearward end affixing a hitch coupler 54 connects to a rear support 70 upper end 70a affixing hitch ball 72, and rear support 70 lower end 70b is pivotally connected to the towed vehicle frame 92 by a pair of pivotal connection 73 connecting to a pair of brackets 74 affixed to the towed vehicle frame 92, such that rear support 70 is able to swing fore and aft around pivotal connection 73. In this structure, the swinging fore and aft of the rear support 70 compensates the changing distance between the towing vehicle and the towed vehicle when vehicles are moving, and pluralities of holes 55 on center beam-extension rear section 50c allows different hole 55 to be used to align with hole 56 on center beam-extension mid-section 50b for pin 57 to push through, such that center beam-extension lengths can be adjusted to suit for different towed vehicles to be towed.

What is claimed is:

1. An anti-sway trailer hitch assembly 10 for articulately connecting a towing vehicle 80 to a towed vehicle 90, comprising:

a hitch frame 20 having a forward end for connection to the rear of said towing vehicle rearward, a rearward end having a roller 28 in pivotal connection to said hitch frame 20 by a pivotal connection 28a; wherein the hitch frame has a first pivot point, and a second pivot point, a center beam 30 having a forward end 30a in pivotal connection to said hitch frame 20 first pivot point by a connection 31, said connection allowing said center beam to swing laterally around said connection; wherein the center beam has a central portion 30b, and a rearward end 30c, a center shaft 34 in pivotal connection to said center beam central portion 30b by a connection 35, said connection allowing said center shaft to rotate vertically in said center beam 30, a hitch beam 60 having a forward end 60a in pivotal connection to said hitch frame 20 second pivot point by a connection 61, said connection allowing said hitch beam to swing laterally around said connection; said hitch beam has a central portion having a slot 62, and a rearward end 60c having a connecting point 64a, a connection point 94a on on a forward end said towed vehicle in pivotal connection to said connecting point 64a on said hitch beam 60 rearward end by a connection, a slot 37 rigidly attached to the center shaft 34, said roller 28 on said hitch frame 21 positioned in said slot 37, an arm 44 rigidly attached to said center shaft, a roller 46 in pivotal connection to said arm 44 by a pivotal connection 46a, said roller 46 positioned in said slot 62 on said hitch beam 60, a center beam-extension 50 having a forward end 50a in pivotal connection to said center beam 30 rearward end 30c by a pivotal connection 51, said connection allowing said center beam-extension to swing an arc vertically around said connection; said center beam having a mid-section 50b and a rear section 50c having a front-end and a rear-end, said rear section 50c in a slide-able connection to said mid-section 50b forming a variable-length member, said rear section 50c rear-end having pivotal connection to a rear support 70 by a pivotal connection 71, said rear support 70 affixing firmly to a frame or body of said towed vehicle.

2. The hitch assembly of claim 1, wherein said pivotal connection is a removable connection allowing said towed vehicle frame to be removed from said hitch beam.

3. The hitch assembly of claim 1, wherein said pivotal connection 51 is a removable connection allowing said center beam-extension 50 to be removed from said center beam 30.

4. The hitch assembly of claim 1, wherein said pivotal connection 71 is a removable connection allowing said center beam-extension 50 to be removed from said rear support 70.

5. The hitch assembly of claim 1, wherein said pivotal connection 28a allows said roller 28 to rotate on a pin 27 affixed to said hitch frame 20.

6. The hitch assembly of claim 1, wherein said pivotal connection 46a allows said roller 46 to rotate on a pin 47 affixed on said arm 44.

7. An anti-sway trailer hitch assembly 10 for articulately connecting a towing vehicle 80 to a towed vehicle 90, comprising:

a hitch frame 20 having a forward end for connection to the rear end of said towing vehicle rearward, a rearward end having a roller 28 in pivotal connection to said hitch frame 20 by a pivotal connection 28a; wherein the hitch frame has a first pivot point, and a second pivot point, a center beam 30 having a forward end 30a in pivotal connection to said hitch frame 20 first pivot point by a connection 31, said connection allowing said center beam to swing laterally around said connection; wherein the center beam has a central portion 30b, and a rearward end 30c, a center shaft 34 in pivotal connection to said center beam central portion 30b by a connection 35, said connection allowing said center shaft to rotate vertically in said center beam 30, a hitch beam 60 having a forward end 60a in pivotal connection to said hitch frame 20 second pivot point by a connection 61, said connection allowing said hitch beam to swing laterally around said connection; said hitch beam has a central portion having a slot 62, and a rearward end 60c having a connecting point 64a, a connection point 94a on on a forward end said towed vehicle in pivotal connection to said connecting point 64a on said hitch beam 60 rearward end by a connection 95, a slot 37 rigidly attached to the center shaft 34, said roller 28 on said hitch frame 21 positioned in said slot 37, an arm 44 rigidly attached to said center shaft, a roller 46 in pivotal connection to said arm 44 by a pivotal connection 46a, said roller 46 positioned in said slot 62 on said hitch beam 60, a center beam-extension 50 having a forward end 50a in pivotal connection to said center beam 30 rearward end 30c by a pivotal connection 51, said connection allowing said center beam-extension to swing an arc vertically around said connection; said center beam having a central section 50b and a rear section 50c having a front-end and a rear-end, said central section 50*b* and rear section 50*c* connecting together to form a member of which the length is adjustable, said rear section 50*c* rear-end having a pivot connection to a rear support 70 by a pivotal connection 71, the said rear support 70 in pivotal connection to a frame existing on said towed vehicle by a pivotal connection 73, said connection allowing said rear support 70 to swing in an arc fore and aft in a longitudinal direction around said connection in said towed vehicle.

8. The hitch assembly of claim 7, wherein said pivotal connection is a removable connection allowing said towed vehicle frame to be removed from said hitch beam.

9. The hitch assembly of claim 7, wherein said pivotal connection 51 is a removable connection allowing said center beam-extension 50 to be removed from said center beam 30.

10. The hitch assembly of claim 7, wherein said pivotal connection 71 is a removable connection allowing said center beam-extension 50 to be removed from said rear support 70.

11. The hitch assembly of claim 7, wherein said pivotal connection 28*a* allows said roller 28 to rotate on a pin 27 affixed to said hitch frame 20.

12. The hitch assembly of claim 7, wherein said pivotal connection 46*a* allows said roller 46 to rotate on a pin 47 affixed to said arm 44.

* * * * *